(12) United States Patent
Rambal Fattori et al.

(10) Patent No.: US 12,015,274 B2
(45) Date of Patent: Jun. 18, 2024

(54) PORTABLE CONTROLLER FOR DRYING EQUIPMENT AND RELATED SYSTEM AND METHOD

(71) Applicant: ROBBIE RESTORATION TECHNOLOGIES INC., Toronto (CA)

(72) Inventors: Ricardo Antonio Rambal Fattori, Antioquia (CO); Ricardo Alberto Rambal Santacruz, Bogota (CO)

(73) Assignee: ROBBIE RESTORATION TECHNOLOGIES INC., Toronto (CA)

( * ) Notice: Subject to any disclaimer, the term of this patent is extended or adjusted under 35 U.S.C. 154(b) by 115 days.

(21) Appl. No.: 17/734,215

(22) Filed: May 2, 2022

(65) Prior Publication Data
US 2022/0360080 A1    Nov. 10, 2022

Related U.S. Application Data

(60) Provisional application No. 63/183,719, filed on May 4, 2021.

(51) Int. Cl.
*H02J 3/14* (2006.01)
*F26B 21/08* (2006.01)
(Continued)

(52) U.S. Cl.
CPC ............... *H02J 3/14* (2013.01); *F26B 21/08* (2013.01); *F26B 21/10* (2013.01); *H02J 13/00002* (2020.01); *H02J 13/00006* (2020.01)

(58) Field of Classification Search
CPC .. H02J 3/14; H02J 13/00002; H02J 13/00006; F26B 21/08; F26B 21/10; F26B 21/001; F26B 25/22
See application file for complete search history.

(56) References Cited

U.S. PATENT DOCUMENTS 10,083,599 B2 * 9/2018 Sager .................. G08B 25/005
10,145,571 B2   12/2018 Bourgault et al.
(Continued)

FOREIGN PATENT DOCUMENTS

JP              5014378 B2    8/2012

*Primary Examiner* — Rexford N Barnie
*Assistant Examiner* — Thai H Tran

(57) ABSTRACT

Current technologies for restoring buildings and spaces, such as drying processes to remove water damage, are prone to technical error and operational error. A portable controller is herein provided to autonomously monitor and control restoration equipment, including drying equipment. The portable controller is in data communication with a server system, and the server system can remotely control the portable controller. The portable controller includes outlet receptacles to which the drying equipment is connectable. The portable controller includes a computer that autonomously determines when to provide electrical power and when to cut off the electrical power to the outlet receptacles, in order to respectively activate and deactivate the drying equipment. The portable controller also senses environment conditions and electrical power consumption caused by the drying equipment. This data is transmitted to the server system for storage and analysis.

21 Claims, 9 Drawing Sheets

(51) Int. Cl.
*F26B 21/10* (2006.01)
*H02J 13/00* (2006.01)

(56) References Cited

U.S. PATENT DOCUMENTS

| | | | |
|---|---|---|---|
| 10,514,177 B2 | 12/2019 | Hussain et al. | |
| 2005/0286220 A1* | 12/2005 | Moore | H05K 7/20836 |
| | | | 361/679.46 |
| 2007/0115630 A1* | 5/2007 | Midgley | H02B 1/565 |
| | | | 361/690 |
| 2007/0276548 A1* | 11/2007 | Uzunovic | H04L 12/12 |
| | | | 700/297 |
| 2012/0095610 A1* | 4/2012 | Chapel | G05F 1/66 |
| | | | 700/297 |
| 2013/0073060 A1* | 3/2013 | Dawley | H02J 13/00016 |
| | | | 700/20 |
| 2020/0408425 A1 | 12/2020 | Zchori | |

* cited by examiner

PORTABLE CONTROLLER FOR DRYING EQUIPMENT AND RELATED SYSTEM AND METHOD

CROSS-REFERENCE TO RELATED APPLICATIONS

This application claims priority to United States Provisional Application No. 63/183,719 filed on May 4, 2021 and titled "Portable Controller For Drying Equipment And Relates System And Method", the entire contents of which are herein incorporated by reference.

TECHNICAL FIELD

The following generally relates to a portable controller that controls restoration equipment, including drying equipment.

DESCRIPTION OF THE RELATED ART

In the restoration industry, new spaces or old spaces that are wet require drying. For example, a flooded building (e.g., a basement, a bathroom, a lower floor) will cause water damage to the flooring and the walls. Operators, typically contractors, use drying equipment to dry the flooring, the walls, and the room(s) in the building. Drying equipment includes, for example, blowers, fans, heaters, dehumidifiers, etc. In a construction example, there is wet paint, drying concrete, or water-logged material, or a combination thereof, that requires drying to make a space in the building more usable. Operators will setup drying equipment to dry the space.

Drying equipment, for example a blower, operates by plugging in the blower into a power receptacle and turning on the blower. The drying equipment is then left to run for a long period of time (e.g., days). In many cases, the operator leaves the space and after a few days will return to determine if the space is sufficiently dry. This determination can be made by the operator making a sensory judgement (e.g., touching the flooring, wall, etc.), or by using a handheld sensor (e.g., a humidity sensor), or both. If the operator decides that the space is sufficiently dry, the operator will turn off the drying equipment and remove it from the space.

It is herein recognized that this drying process is prone to equipment error, operational error, energy inefficiency, time inefficiency, or a combination thereof. People (e.g., the operator or other people) may unplug the drying equipment, causing delay in the drying process. For example, due to the noise or some other reason, the drying equipment is turned off or unplugged by someone. In another example, due to the high power consumption of the drying equipment, the building's circuit sometimes becomes overloaded causing a fuse outage or a circuit to break, thereby deactivating the drying equipment. The operator is usually not made aware that the drying equipment is turned off, as the operator is elsewhere. In other words, the operator is not made aware that the drying process has stopped until the operator comes back to the location to make a checkup.

The operator, typically at a scheduled time after a few days from the initial drying equipment setup, checks on the space to see if the material in the space or the air is dry. It is herein recognized that this is a time-consuming process to visit and check the space, and even more of a time inefficiency when the space is not sufficiently dry.

It is also herein recognized that, when an operator uses feel or touch to determine if the flooring is sufficiently dry, the operator is making a relative judgement, which is prone to error. Even when operators use a handheld sensor to measure the wetness, humidity, or other environmental parameters of the space to be dried, the handheld sensor is often not calibrated. For example, handheld sensors from different manufacturers, or even the same manufacturer, can give different measurements. In particular, contractors usually each have their own handheld sensors, and this can lead to varied and unreliable measurements amongst different contractors.

It is therefore desirable to herein provide a portable controller that monitors and controls drying equipment.

BRIEF DESCRIPTION OF THE DRAWINGS

Embodiments will now be described by way of example only with reference to the appended drawings wherein.

DETAILED DESCRIPTION

Figure 1:
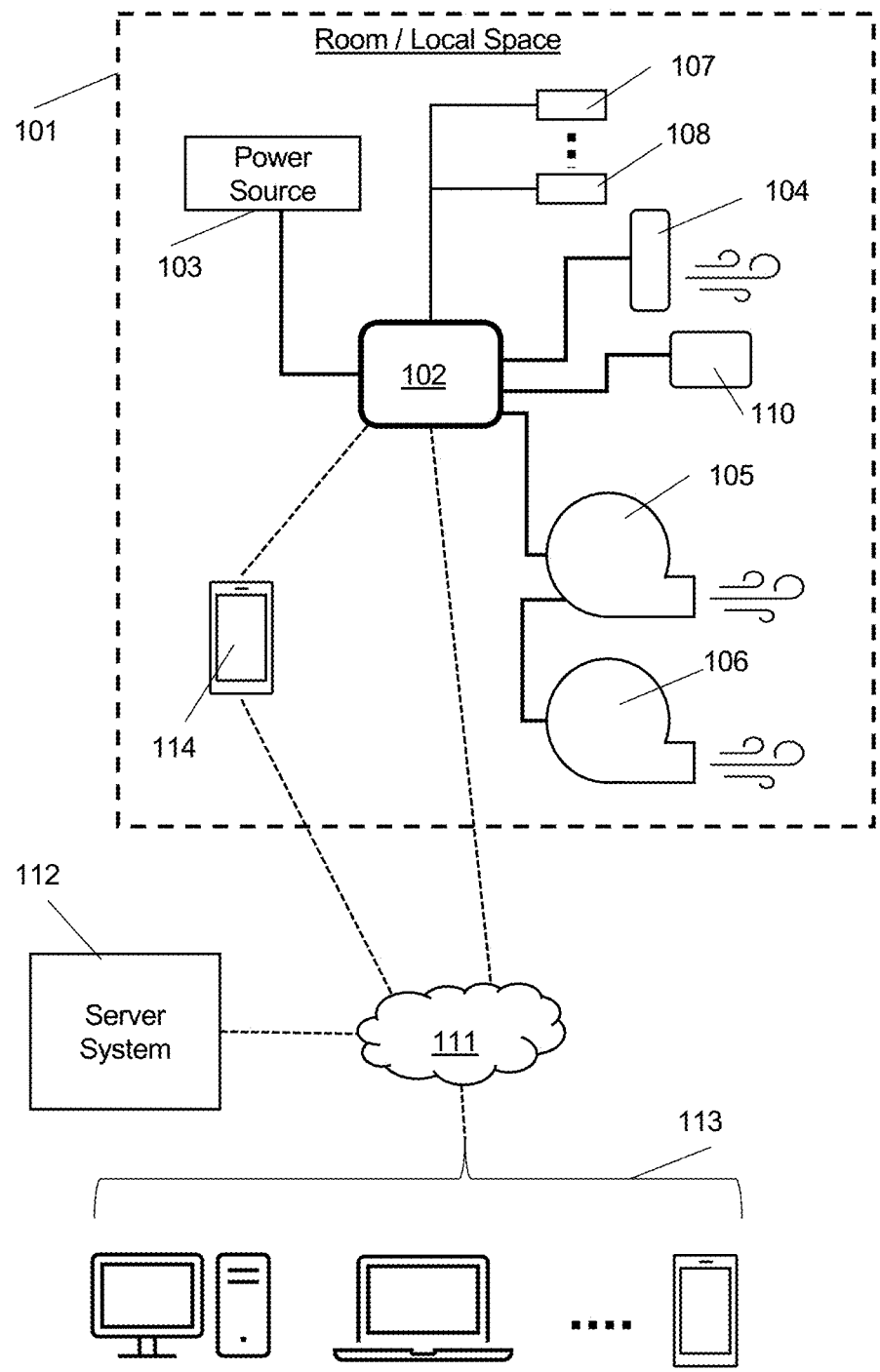
FIG. 1 is a schematic diagram of a system that includes a portable controller that monitors and controls drying equipment. The system also includes a server system and one or more user devices that remotely interact with the portable controller, according to an example embodiment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

Within this specification, different structural entities (which may variously be referred to as "computer", "units", "circuits", "systems", "processors", "module", "interface", other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform one or more tasks during operation. A structure can be said to be "configured to" perform some task even if the structure is not currently being operated. A "computer configured to control a switch" is intended to cover, for example, an integrated circuit that has circuitry that performs this function during operation, even if the integrated circuit in question is not currently being used (e.g., a power supply is not powering it). Thus, an entity described or recited "configured to" perform some task refers to something physical, such as a device, circuit, memory storing program instructions executable to implement the task, etc. This phrase is not used herein to refer to something intangible.

Reciting in the appended claims that a structure is "configured to" perform one or more tasks is intended not to be interpreted as having means-plus-function elements.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this specification, numerous specific details have been set forth. It is to be understood, however, that implementations of the disclosed technology may be practiced without these specific details. In other instances, well-known methods, structures, and techniques have not been shown in detail in order not to obscure an understanding of this description. References to "for example", "some examples," "other examples," "one example," "an example," "various examples," "one embodiment," "an embodiment," "some embodiments," "example embodiment," "various embodiments," "example aspect," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Turning to an example embodiment shown in FIG. 1, it is desirable to dry a room or local space 101. Examples of a room include a room in a building, a shelter, or some other structure. Examples of a local space include a space within a vehicle, a space within a structure, an exposed space, a construction area, an excavation area, etc. For example, the room or local space is wet due to water damage (e.g., caused by a water leak, flooding, rain, etc.) or construction activities (e.g., wet cement, washing, wet paint, etc.). For example, the material (e.g., ground, flooring material, walls, posts, ceiling, furniture, an object, etc.) in the room or local space is wet. To dry the material more effectively, one or more drying devices 104, 105, 106, which are also herein generally referred to as drying equipment, are brought into and positioned within the room or local space 101. A portable controller is also brought into and positioned within the room or local space 101 to monitor and control the one or more drying devices 104, 105, 106. In an example aspect, after the room or local space 101 is sufficiently dried, then the one or more drying devices 104, 105, 106 and the portable controller 102 are removed from the room or the local space 101.

The portable controller 102 is connected to a local electrical power source 103. For example, the power source is provided by an electrical grid of a building. In another example, the power source is independent from an electrical grid, such as a battery or a generator. One or more drying devices 104, 105, 106 are connected to the portable controller 102. The portable controller 102 draws electrical power from the power source 103 and distributes the electrical power to the one or more drying devices 104, 105, 106. The portable controller 102 can control the power to activate or deactivate the one or more drying devices 104, 105, 106. The portable controller 102 also includes sensors (see FIG. 2) that monitor the power draw caused by the one or more drying devices 104, 105, 106, or sensors that monitor the environmental conditions in the room or local space 101, or both. In an example aspect, the sensors are positioned within or on the portable controller 102. In another example aspect, one or more sensors 107, 108 are external and connectable to the portable controller 102. The portable controller 102 uses the sensor data as input to execute control computations, which activate and deactivate the one or more drying devices 104, 105, 106 under certain conditions.

It will be appreciated that the portable controller 102 can be used to provide electrical power to and control different types of drying devices. Examples of drying devices include blowers, heaters, dehumidifiers, and combinations thereof. The shape, configuration and capabilities of the drying equipment vary between manufacturers. In an example aspect, two or more drying devices can be daisy chained together. For example, power from the portable controller 102 is sent to the drying device 105, and power from the drying device 105 is sent to the drying device 106. It will also be appreciated that the three drying devices are shown as an example, and that the number of drying devices can vary.

In another example embodiment, other types of equipment 110 used in a restoration process or a construction process can be connected to the portable controller 102, and the portable controller 102 provides electrical power to and control the other equipment 110. Examples of other equipment include lighting equipment, mixers, and tools.

The portable controller 102 is in wireless data communication with a server system 112 via a network 111 (e.g., using cell phone networks or Internet networks, or both). One or more client devices 113 are in data communication with the server system 112 via the network 111. The server system 112 includes, for example, one or more server machines or a cloud computing server system, or a combination thereof. The one or more client devices, also herein called user devices, include, for example, desktop computers, laptops, tablets, smart watches, and mobile devices (e.g., smart phones, phablets, etc.).

In an example embodiment, the portable controller 102 transmits operational data and sensor data to the server system 112. The server system 112 analyzes the data and presents this data to the one or more client devices 113. In an example embodiment, the server system 112 generates one or more control commands and transmits these one or more control commands to the portable controller 102, which in turn executes the control commands. In another example embodiment, a given client device 113 generates one or more controls commands and transmits these one or more control commands to the server system 112; the server system 112 transmits these one or more control commands to the portable controller 102; and the portable controller 102 executes these one or more control commands. For example, these one or more control commands that are received and executed by the portable controller will affect the operation of one or more of the drying devices.

The server system 112 stores and analyses the data obtained from the portable controller 102. The server system 112, for example, uses the analyzed data to detect anomalies and, in turn, sends an alert message to the one or more client devices 113. In another example embodiment, the server system 112 presents data to the one or more client devices 113 including one or more of the following types of data: real-time data, near-real-time data, historical data, predicted data, and combinations thereof. The data, for example, can be presented to the client device 113 via an email, a text message, a native application, or a web browser.

In an example embodiment, the remote controller 102 autonomously monitors and controls the drying equipment.

In an example embodiment, the server system 112 autonomously monitors and controls the drying equipment, via the portable controller 102.

In an example embodiment, an operator can use their client device 113 to remotely monitor and control the drying equipment, without being physically present at the room or local space 101. This control, for example, is sent via the server system 112 to the portable controller 102, or directly to the portable controller 102.

In an example embodiment, the location of the remote controller 102 and other operational parameters are transmitted to the server system 102.

In an example embodiment, a local client device 114 that is in the same room or local space 101 is tracked by a global positioning system or a local positioning system, or both. The server system 114 confirms use the position information from the particular client device 114 to record when the particular client device 114 was in the same room or local space as the portable controller 102. This location confirmation can be used, for example, to authorize control of the owner of the particular client device 114 to affect control of the portable controller 102. In another example aspect, the location confirmation can also be used to keep a record of when the owner of the particular client device 114 came to visit the room or local space 101 while the portable controller 102 was in operation.

Figure 2:
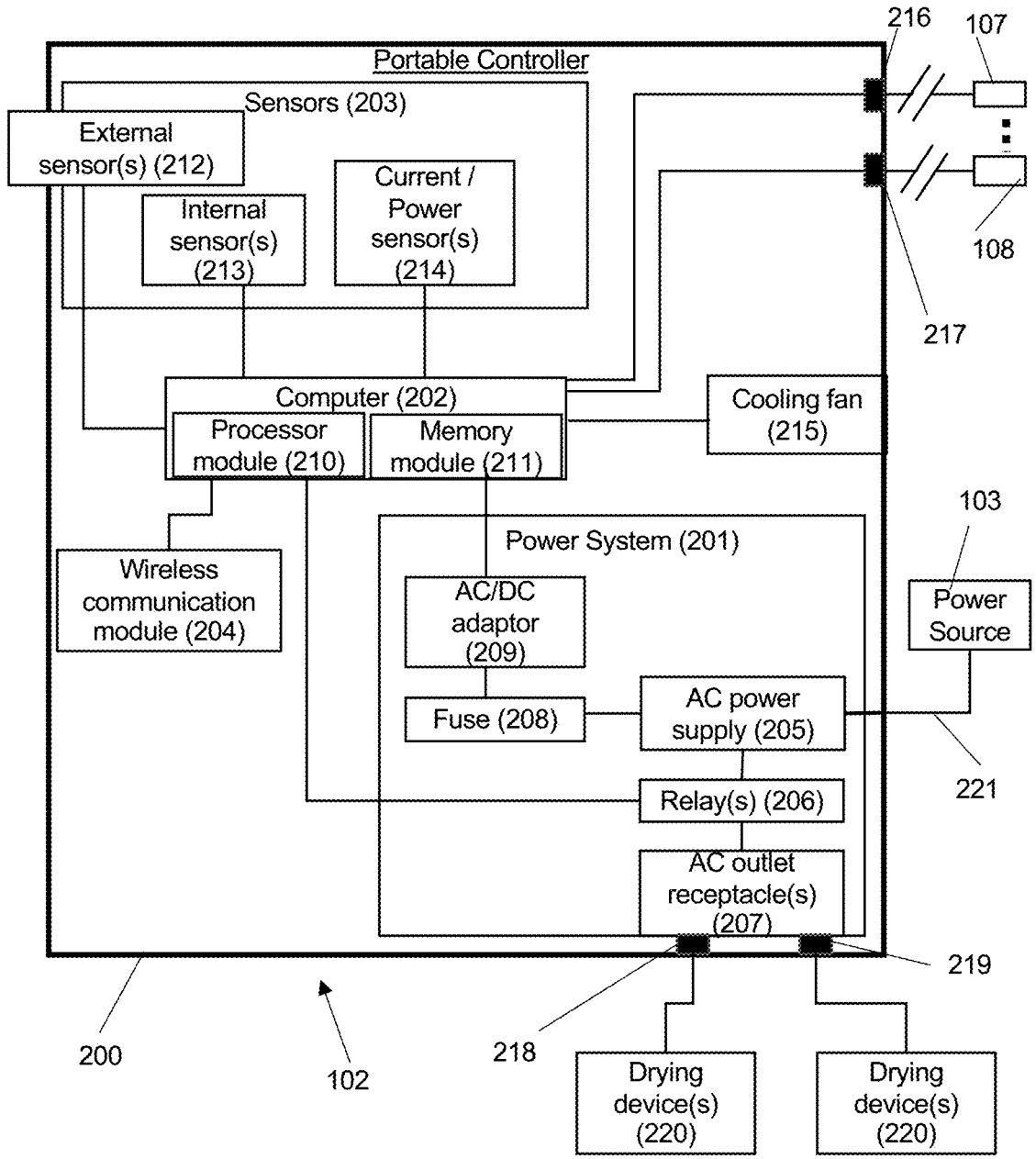
FIG. 2 is a schematic diagram of a portable controller showing its components, according to an example embodiment.

Turning to FIG. 2, example components of the portable controller 102 are shown. The portable controller 102 includes a housing 200 that holds and protects the components in a portable manner. The components include a power system 201, a computer 202, one or more sensors 203, and a wireless communication module 204.

In an example aspect, the wireless communication module 204 is a cellular radio network module. For example, the cellular radio network module is configured to communicate over a LTE network, a 5G network, a 4G network, a 3G network, a GSM network, or other currently known and future known wireless networks. In another example, the wireless communication module 204 is configured for Wi-Fi communication, or Bluetooth communication, or both. In an example aspect, the wireless communication module 204 is trackable by a positioning system using the communication network. In this way, the location of the portable controller can be determined at any given time.

Continuing with FIG. 2, an alternating current (AC) power supply 205 receives electrical power from an external power source 103. The AC power supply 205 transmits electrical power to one or more electrical relays 206. In an example aspect, the one or more relays 206 are solid state relays. In another example aspect, the one or more relays 206 are mechanical relays. Although the term relay is used in the example embodiments, other types of electrical switches that are controllable by the computer 202 can be used in the portable controller. Electrical power flows through the one or more electrical relays 206 to the one or more AC electrical receptacles 207, also herein called electrical outlets. One or more drying devices 220 can connect to the one or more receptacles 207.

The AC power supply 205 also supplies power to an alternating current to direct current (AC/DC) adaptor 209. In an example aspect, a fuse 208 is positioned along the electrical supply between the AC power supply 205 and the AD/DC adaptor 209. DC electrical power is outputted from the AC/DC adaptor 209, and it is supplied to the computer 202.

The power system 201 includes one or more of the AC power supply 205, the one or more relays 206, the one or more receptacles 207, the AC/DC adaptor 209, and the fuse 208.

In an example embodiment, the AC power supply 205 is rated for 120V AC, the AC/DC adaptor 209 outputs a lower power DC voltage, and the one or more relays 206 are solid state relays rated for 40 Amps AC and 380 Volts. Other rated types of power components can be used in other example embodiments.

The computer 202 includes, amongst other components, a processor module 201 and memory module 211. The computer 202 receives DC electrical power and the computer 202 also distributes DC electrical power to one or more sensors 203, the wireless communication module 204, and a cooling fan 215. The cooling fan 2015 is mounted on the housing 200 and vents air to provide cooling for the components.

The one or more sensors 203 includes one or more current sensors 214, also herein called power sensors, to measure electrical consumption caused by the drying devices.

In another example aspect, the one or more sensors 203 includes external sensors 212 that measure external environmental conditions (e.g., temperature, humidity, dew point, light, etc.). In an example aspect, a sensing portion of the sensor is positioned at the housing 200, or protrudes from the housing 200.

In another example aspect, one or more other external sensors 107, 108 are removably connectable to the portable controller 102. These sensors 107, 108 can be positioned at a distance away from the portable controller 102 as they are in data communication (e.g., wired or wireless) with the computer 202 of the portable controller 102.

Examples of one or more external sensors 212 include a temperature sensor, a humidity sensor, a thermo hygrometer, etc. An example of an internal sensor includes a temperature sensor. Examples of a removably connectable sensor include a temperature sensor, a humidity sensor, and a moisture meter. A moisture meter has one or more pins that stick into a material, such as wood or a wall, to determine the moisture of the material.

The computer 202 controls the one or more relays 206, thereby controlling the activation and deactivation of the one or more drying devices 220, or controlling a power level of the one or more drying devices 220. The computer's control includes using sensor data to make a control decision.

In an example aspect, the housing 200 includes one or more wire ports 216, 217 to receive a wired connector of one or more external sensors (e.g., external sensors 107, 108). In another example aspect, receptacle interfaces 218, 219, which receive electrical plugs from the one or more drying devices 220, are positioned on the housing 200. In another example aspect, a power cable 221 extends from the portable controller and its end is removably connectable to a power source 103.

Figure 3:
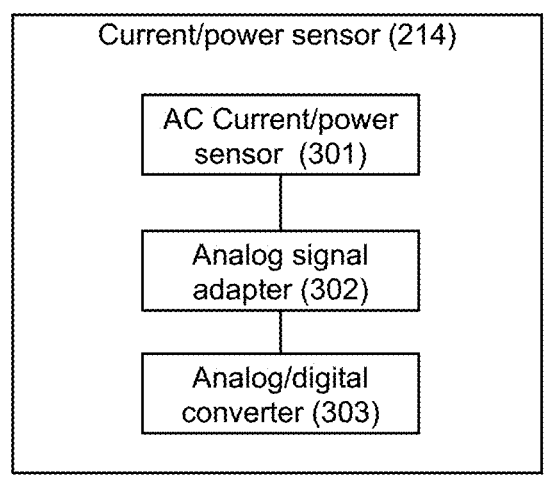
FIG. 3 is a schematic diagram of a current or power sensor within a portable controller, according to an example embodiment.

Turning to FIG. 3, an example embodiment of a current sensor or power sensor 214 is provided. The sensor component 301 measures the AC current or power in a wire. In an example aspect, the sensor component 301 is positioned to measure the current flowing through wiring supplying the outlet receptacles 207. For example, the sensor component 301 is a non-invasive type and clamps around the wiring that supplies AC power to the outlet receptacles. The sensor 301 is connected to an analog signal adapter 302, which in turn is connected to an analog to digital converter 303. The analog to digital converter is connected to, and transmits digital data to, the computer 202. It will be appreciated that other configurations of current sensors or power sensors can be used to measure the current or power usage caused by the drying equipment, or other equipment, or a combination thereof, that are connected to the portable controller 102.

It is herein recognized that it is desirable to monitor the power being consumed by the drying equipment for one or more different reasons.

In an example aspect, measuring when the power is being consumed helps to confirm that drying has taken place at a certain time and location. Measuring how much power is being consumed indicates the type of drying equipment being used or quantity of drying equipment being used, or both. For example, a table correlating power consumption with different types of drying equipment is stored in memory on the computer 202 or in memory on the server system 102. In an example embodiment, the computer 202 or the server system 102 (or both) accesses the table by inputting the measured power consumption to identify potential drying device being used, and then validates if the potential drying device matches the drying device that was claimed to be used by an operator. In another example embodiment, the computer 202 or the server system 102 (or both) accesses the table by inputting the drying device that was claimed to be used by the operator to identify the predicted power consumption, and then validates if the predicted power consumption matches the measured power consumption. In another example aspect, if the results between the expected or predicted data do not match with the information claimed and provided by the operator, then an alert for possible fraud is generated and transmitted to one or more client devices 113.

In an example aspect, this information is helpful to prevent fraud. By way of example, operators/contractors will tell customers or insurance companies that they took a long amount of time (e.g., one week) to use the drying equipment to dry the room or local space, but in fact the actual time to use the drying equipment to achieve a dried state would only take a few days (e.g., 3 days). The information from the portable controller is used to confirm when and how much power is drawn.

In another example aspect, this information is helpful to compensate the operator/contractor or client for the power consumption used in the drying process. For example, an insurance company will include the cost of the power used into the insurance claim.

In another example aspect, this information is helpful to determine if the drying equipment is turned on or off. For example, the drying equipment is loud and someone may turn it off without telling the operator or contractor responsible for the drying process. This stops the drying process usually without alerting the operator or contractor. In another example, the drying equipment malfunctions and turns off, which is usually not known to the operator or contractor. However, using the portable controller, these unexpected equipment shutdowns can are tracked by detecting a power drop or current drop.

In another example aspect, measuring how much power is being drawn helps to control the power usage at the portable controller 102. It is herein recognized that if too much power is being drawn by the drying equipment, the power source 103 is affected. For example, too much power drawn will damage the power source, or the local circuit breaker is switched off, or a local fuse is broken, or some other failure, which causes difficulty. In either event, the drying equipment stops operating. Further, even in the ideal scenario that there is a local circuit breaker, which can be reset, the operator or contractor now needs to look for the circuit breaker panel which is typically located in some other location away from the room or local space 101. In the event a fuse is blown, by the time an operator discovers the blown fuse, the operator will then need to take the effort to obtain a correct replacement fuse, and then replace the fuse; this could take a day or even more. If more permanent damage is done to the power source, then the repair work to the power source will take even longer. However, by using the portable controller, which monitors the power draw, the portable controller can use the relay switch to preemptively control one or more relays to disconnect or limit the power draw from one or more of the drying devices connected to the portable controller. This avoids a power strain on the power source.

In another example aspect, tracking the power draw in combination with other information (e.g., location, time, temperature, humidity, etc.) leads to more analytics and better control.

Figure 4:
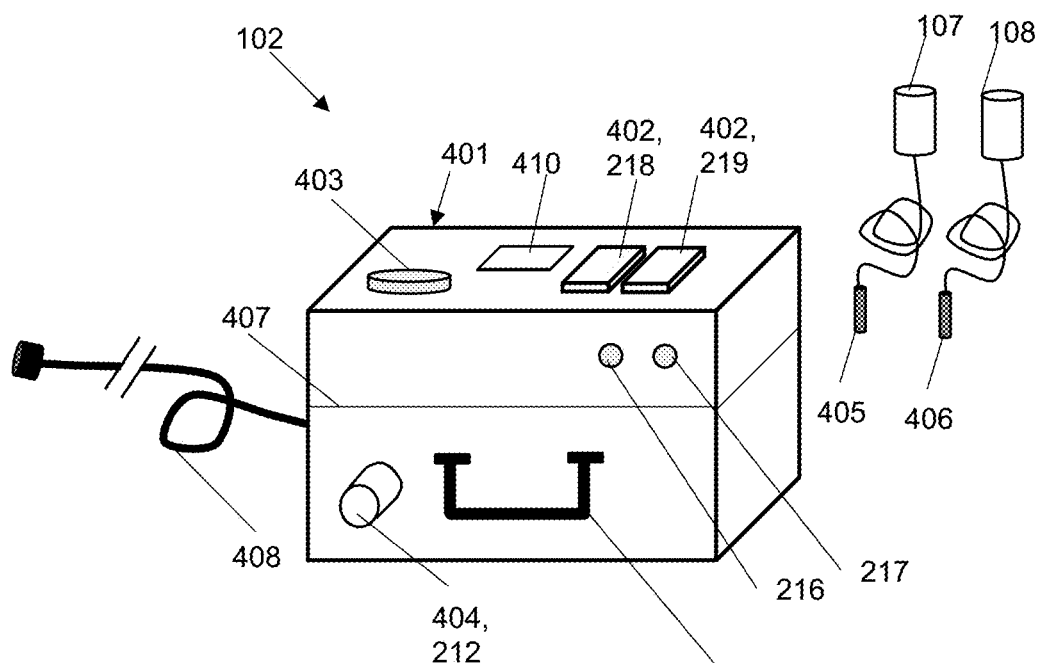
FIG. 4 is a perspective view of a portable controller, according to an example embodiment.

Turning to FIG. 4, another example embodiment of a portable controller 102 is shown from a front perspective view. The example housing 401 is shown. A power cable 408 extends from the housing 401, and the cable 408 has a plug at its end that is connectable to a power source 103.

Receptacle interfaces 218, 219 are positioned at the exterior of the housing 401. In an example embodiment, interfaces 218, 219 are covered by movable covers 402, which prevent dirt and water from entering the receptacle interface 218, 219 while not in use. The movable covers 402 are put into an open position when an electrical plug of drying equipment is inserted into the interface 218 or 219, or both. In an example embodiment, each movable covers is attached by a hinge to the housing and each movable cover is biased to rotate about the hinge to a closed position by a spring. Other types of movable covers can be used. Although two receptacle interfaces are shown, it will be appreciated that the number of receptacle interfaces can vary (e.g., one, two, three, four, etc.).

The housing 401 also includes a vent 403, which is placed in proximity to the cooling fan 215. The housing 401 also includes a sensor 212 that protrudes from the housing exterior for measuring external environmental conditions (e.g., temperature or humidity, or both). A sensor cover or protector 404 mechanically protects the sensor 212. The housing 401 also includes one or more ports 216, 217 to connect to external sensors 107, 108. In particular, the sensor 107 has a wire lead 405 that is insertable into at least one of the ports 216, 217. Similarly, the sensor 108 has a wire lead 406 that is insertable into at least one of the ports 206, 207.

In an example embodiment, the receptacle interface 218, 219, the vent 403, and the ports 216, 217 are mounted at the top of the housing 401 or near the top of the housing 401. It is herein recognized that the bottom of the portable controller may likely be placed on a floor of the room or space 101, which is a wet surface, and which is to be dried. It is also herein desirable to position these components at some distance away from the wet surface, to keep the components of the portable controller dry. This is also for safety, since the receptacles 218, 219 and the ports 216, 217 are electrical. In other words, some components of the portable controller are positioned at an upper portion of the housing, including the vent 403, the receptacle interface 218, 219, and the ports 216, 217.

In an example embodiment, the one or more sensors 212 that measure humidity or temperature, or both, are positioned near the bottom of the housing 401. It is herein recognized that the bottom of the portable controller may likely be placed on a wet floor of the room or space 101 to be dried. It also herein desirable to measure the humidity or wetness at a close distance from the wet floor, to sense the wetness or dryness more accurately. In other words, the one or more sensors 212 are positioned at a lower portion of the housing 401.

In another example embodiment, the housing 401 includes multiple surfaces that face in different directions. For example, there is a top surface, bottom surface, front surface, left-facing surface, right-facing surface, and a rear surface. In an example embodiment, the vent 403 is positioned on a first surface of the housing that faces a first direction, and the one or more sensors 404, 212 are positioned on a second surface of the housing that faces a second direction which is different from the first direction.

It will be appreciated that the positioning of components on the housing 401 can vary, and these other positions of components are applicable to the portable controller.

In another example aspect, the housing 401 includes an access panel or a clam-shell top, as shown by a seam 407. In other words, the housing 401 can be opened for repair, maintenance, and upgrades.

In another example aspect, at least the bottom surface of the housing 401 is water impermeable to protect the components of the portable controller. In another example, at least the lower portion of the housing is water impermeable. In another example aspect, the entire housing 401 is water resistant. It will be appreciated that the portable controller is suitable for use in wet conditions.

In another example aspects, the housing 401 includes one or more indicator or status lights, a sound speaker, and one or more control switches. In another example aspect, the housing 401 includes one or more handles 409 to easily hold and transport the portable controller. In another example aspect, the housing 401 as positioned thereon a display screen 410, which shows operational information. The display screen is part of the computer 202, or is connected to the computer 202.

In another example aspect, at least the bottom portion of the housing 401 is waterproof, as it will be positioned on a wet surface (e.g., a wet floor).

In an example aspect, the portable controller 102 and the external sensors 107, 108 form a kit of parts.

Figure 5:
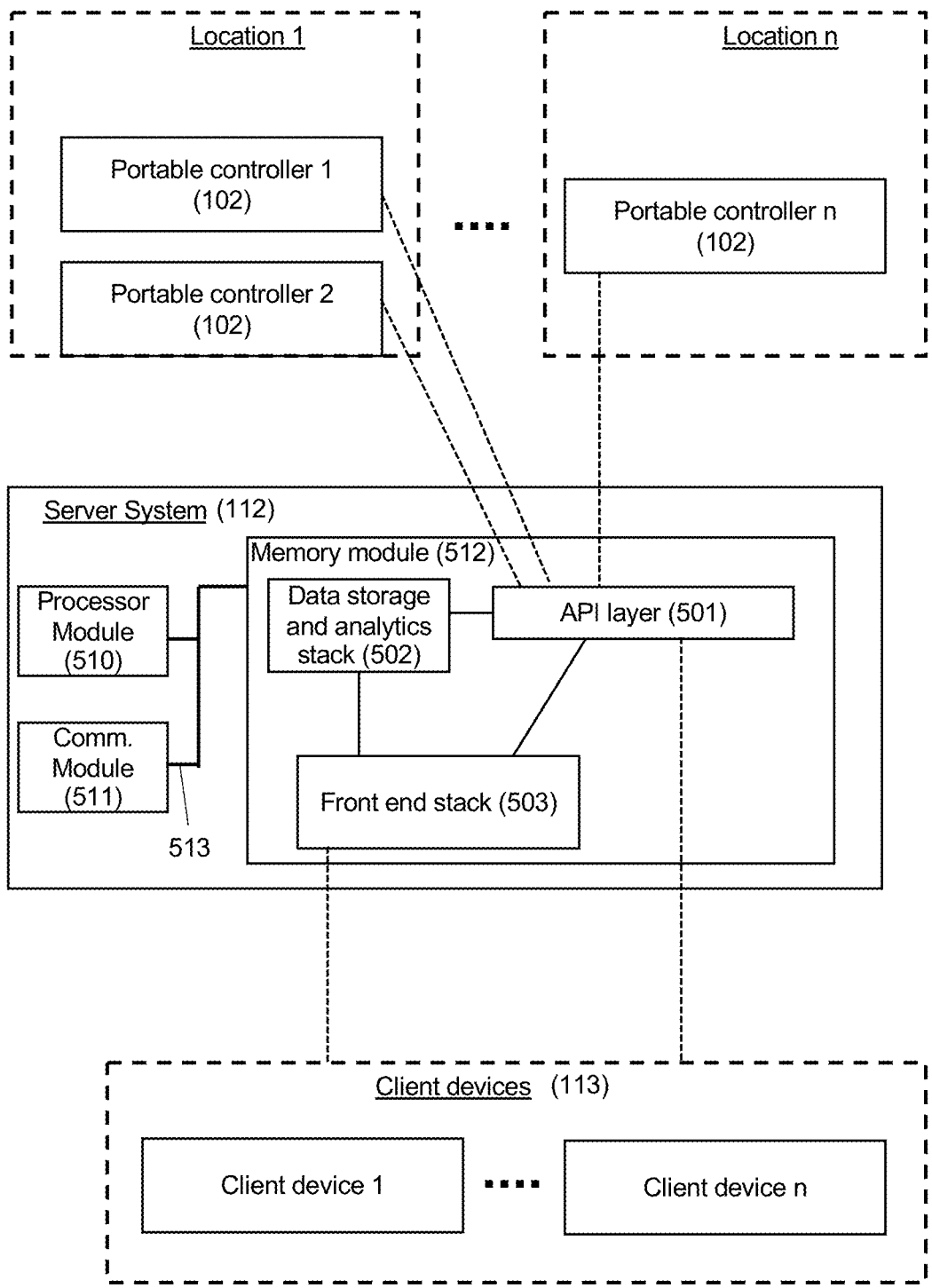
FIG. 5 is a schematic diagram of a system showing the data interaction between a server system, one or more client devices, and one or more portable controllers, according to an example embodiment.

Turning to FIG. 5, an example embodiment of a control and monitoring system is shown, which includes the server system 112 in data communication with multiple portable controllers. The server system 112 includes one or more processor modules 510, memory modules 512 and data communication modules 511 that are connected to each other via a data bus 513. The server system 112 stores and implements an application programming interface (API) layer 501, a data storage and analytics stack 502, and a front-end stack 503. One or more portable controllers located at different locations can communicate with the server system 112 via the API layer 501. One or more client devices 113 can communicate with the server system 112 via the front-end stack 503. For example, the front-end stack includes a web portal accessible via an Internet browser application, a native application, an email messaging system, a text messaging system, or a combination thereof. Alternatively, or in addition the front-end stack, the one or more client devices 113 and the server system 112 transmit data to each other via the API layer 501. It will be appreciated that a client device can view real-time data (or near real-time data), logs, and reports as made available by the server system 112. In an example aspect, real-time data (or near real-time data) and logs are graphically displayed via a GUI using a web portal or a native application, or both.

The stack 502 obtains data from the client devices and the portable controllers. It will be appreciated that portable controllers can be used in different locations. For example, Location 1 has two portable controllers that are each identified using an ID code (also called the portable controller ID) that is transmittable to the server system 112; and a different Location n has another portable controller that is identified by another ID code that is transmittable to the server system 112. The stack 502 is also used to analyze the data to conduct various operations. For example, the stack 502 executes verification processes, executes monitoring processes, defines operational parameters, outputs alerts, outputs reports, and outputs control commands.

It will be appreciated that the data storage and analytics stack 502, API layer 501, and the front end stack 503 can be distributed across multiple server machines, such as one or more virtual machines, or one or more cloud server systems.

Figure 6:
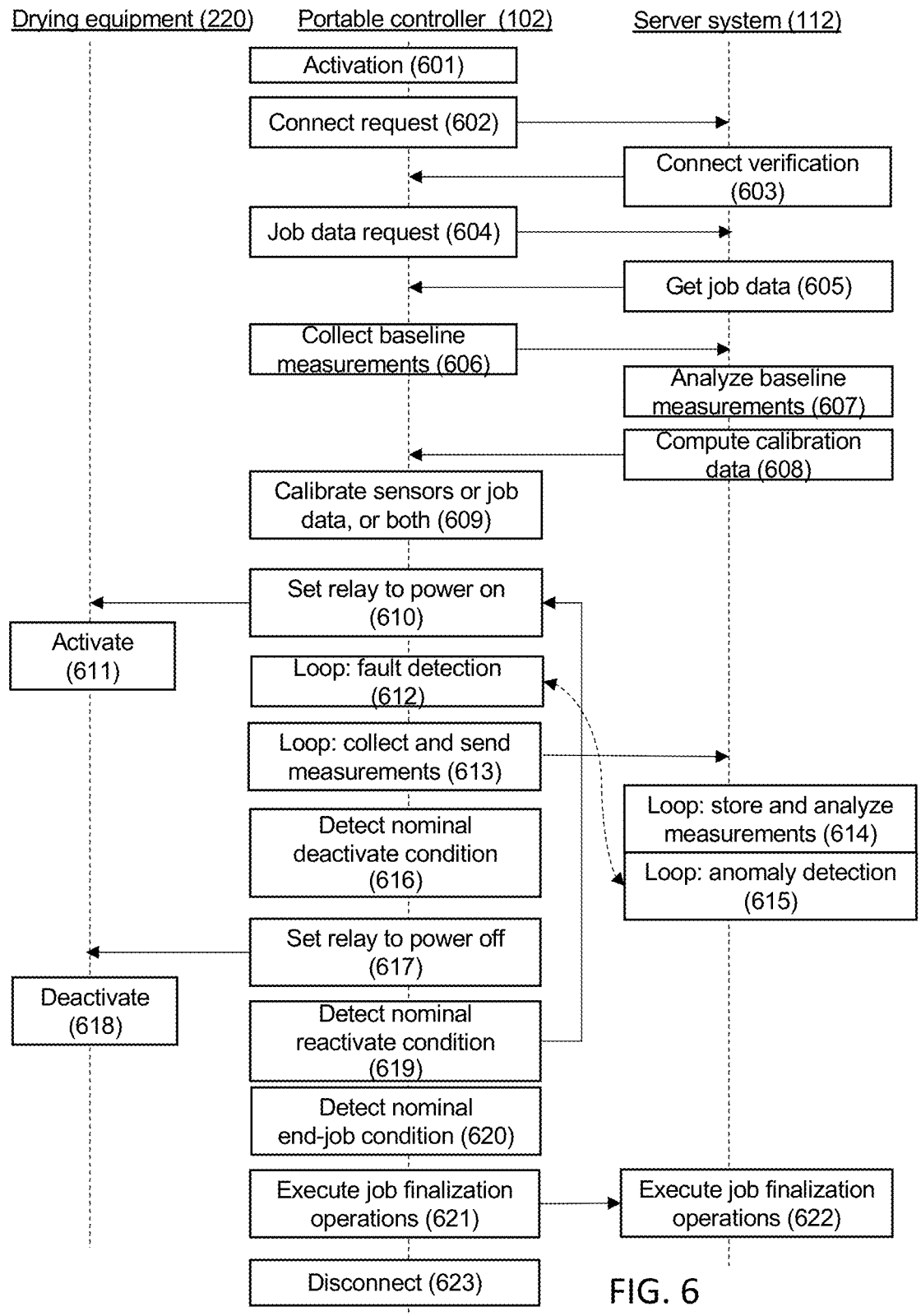
FIG. 6 is a flow diagram of computer executable instructions of a portable controller controlling drying equipment and computer executable instructions of a server system interacting with the portable controller, according to an example embodiment.

Turning to FIG. 6, example operations, including computer executable instructions, are shown in the operation of the portable controller. At block 601, the portable controller 102 is activated. For example, it is turned on.

At block 602, the portable controller, via its wireless communication module, sends a connect request to the server system 112. At block 603, the server system 112 sends a connect verification. In an example aspect, the portable controller has stored thereon an identifier (ID) which is sent in the connect request, and this is ID verified by the server system 112. In another example aspect, this communication handshake at blocks 602 and 603 is used to establish a secured communication channel.

At block 604, the portable controller generates and sends a job data request to the server system. At block 605, the server system responds to the request by searching for the job data that is relevant to the job request and by sending the job data to the portable controller. In an example aspect, the job data is stored on a database on the server system. In another example aspect, the job request sent by the portable controller is associated with the portable controller's ID. In another example aspect, the job request sent by the portable controller includes the location of the portable controller. In another example aspect, the job request sent by the portable controller includes information about the job environment (e.g., size of the room or local space, type of materials in the room or local space to be dried, the type and number of drying equipment, etc.). In another example aspect, the server system's job data includes an area ID, setpoint data, and a job ID. The setpoint data, for example, includes one or more environmental parameters that identify a sufficiently dried space (e.g., a setpoint of humidity, or a setpoint of temperature, or both).

In an example aspect, the portable controller and the server system also execute a calibration process. For example, at block 606, the portable controller collects baseline measurements using one or more of the external sensor(s) 212, the internal sensor(s) 213, the power sensor(s) 214, and the removably connectable sensors 107, 108. Either locally on the portable controller or on the server system, these baseline measurements are analyzed (block 607) and calibration data is computed (block 608). At block 609, the portable controller uses the calibration data to calibrate the sensors or the job data (e.g., setpoint data), or both.

At block 610, the portable controller sets the one or more relays to power on. At block 611, this activation of the relay flows power to the connected drying equipment, which in turn activates the drying equipment.

Figure 7A:
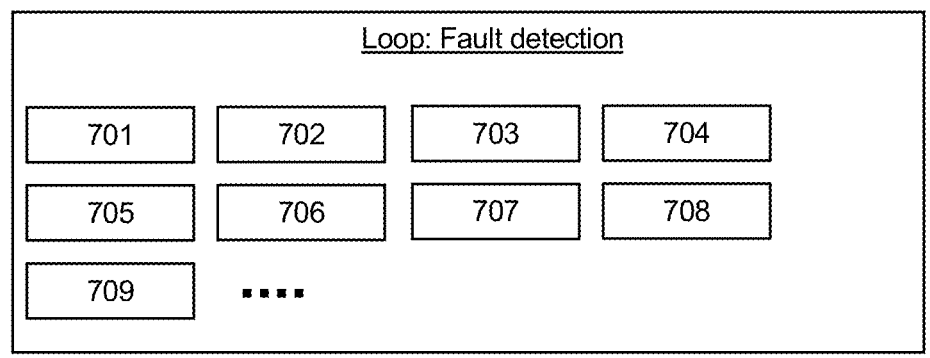
FIG. 7a shows example fault detection conditions.

At block 612, the portable controller repeatedly executes fault detection computations. For example, these computations are executed repeatedly in a loop. Turning to FIG. 7a, example fault computations include one or more of the below computations, which can be executed at block 612.

Block 701: The portable controller detects if the power or the current draw is above an upper current threshold, or has suddenly increased at a rate beyond a current threshold increase rate, or both.

Block 702: The portable controller detects if the power or the current draw is below a lower current threshold, or has suddenly decreased at a rate beyond a current threshold decrease rate, or both.

Block 703: The portable controller detects if the internal temperature is beyond an upper internal temperature threshold.

Block 704: The portable controller detects if the internal temperature is below a lower internal temperature threshold.

Block 705: The portable controller detects if the external humidity is above an upper current threshold, or has suddenly increased at a rate beyond a humidity threshold increase rate, or both. For example, this could indicate more flooding or water damage.

Block 706: The portable controller detects if the external humidity is below a lower humidity threshold, or has suddenly decreased at a rate beyond a humidity threshold decrease rate, or both.

Block 707: The portable controller detects if the external moisture level (using a moisture meter) is above an upper moisture threshold, or has suddenly increased at a rate beyond a moisture threshold increase rate, or both. For example, this could indicate more flooding or water damage.

Block 708: The portable controller detects if the external moisture level (using a moisture meter) is below a lower moisture threshold, or has suddenly decreased at a rate beyond a moisture threshold decrease rate, or both.

Block 709: The portable controller receives an anomaly message from the server system (for example as a result of block 615).

It will be appreciated that other types of fault conditions can trigger a fault detection occurrence.

Turning back to FIG. 6, a fault detection occurrence triggers an error message to be sent to the server system (triggering block 615). In an example aspect, the server system in turn transmits the error message to one or more relevant client devices, indicating the type of fault that has occurred. In another example aspect, a fault detection occurrence triggers the portable controller to automatically execute an action. Example actions include commanding one or more relay switches to stop providing power to the drying equipment, which deactivates the drying equipment (e.g., blocks 617 and 618). Other example actions include creating a local alarm (e.g., light flashing or sound alarm, or both).

At block 613, the portable controller repeatedly collects sensor data and sends the sensor data to the server system. At block 614, the server system repeatedly receives sensor data from the portable controller, and stores and analyzes the data. For example, data trends over a time series are compiled and analyzed. This data is presented to client devices via the front end stack 503 or API layer 501.

At block 615, the server system uses the analysis of the data to repeatedly check for anomalies. In an example aspect, a detected anomaly triggers the server system to send an alert message to the portable controller, which will trigger a fault detection. In an example aspect, the server system also transmits an alert message to one or more relevant client devices.

Figure 7B:
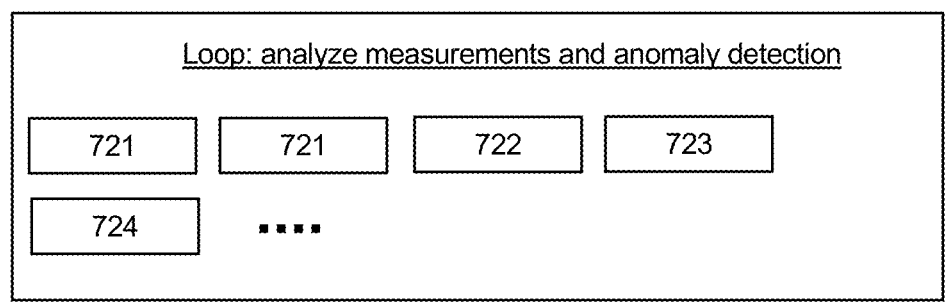
FIG. 7b shows example analyses computations.

Turning to FIG. 7b, example analyses computations are provided below.

Block 720: Compute a comparison of power consumption over time with relative humidity over time, or with temperature over time, or both.

Block 721: Compute a prediction of the total amount of time required to complete the drying process, or when the drying process will be completed.

Block 722: Compute a prediction of total power consumption used to complete the drying process.

Block 723: Compare current drying process with past comparable drying processes (e.g., based on similar location, similar initial conditions of humidity, similar drying equipment, etc.).

Block 724: Compare moisture meter data over time with humidity data over time.

It will be appreciated that these analyses computations can surface anomalies. It will also be appreciated that other analyses computations executable by the server system or the portable controller, or both, are applicable to the devices and systems described herein.

Turning back to FIG. 6, in an example aspect, at block 616, the portable controller detects a nominal deactivate condition. In an example aspect, the nominal deactivate condition is triggered according to a schedule defined by the server system (e.g., job data). For example, the job data (provided at block 605), includes a schedule of when the drying equipment 220 is activated and deactivated (e.g., activated during the day and deactivated at night). In another example aspect, the nominal deactivate condition is triggered by a command originating from the server system 112 or from a given client device 113. In another example aspect, the nominal deactivate condition is that the external sensor(s) 212 or the external removably connectable sensor(s) 117, 118, or a combination thereof, detect that the setpoint condition has been achieved. In other words, the room or space 101 is detected to be sufficiently dry. It will be appreciated that there are different parameters or occurrences that trigger the nominal deactivate condition. This, for example, pauses the drying process.

Following block 616, at block 617 the portable controller sets the one or more relays cut power off to one or more of the receptacles 207. This in turn causes the drying equipment to deactivate (block 618).

In an example aspect, if the portable controller has commanded the one or more relays to cut power off to one or more of the receptacles, but the job is still not yet complete, then it is possible for the portable controller to restart or continue with the drying process. At block 619, the portable controller detects a nominal reactivate condition.

In an example aspect, a nominal reactivate condition includes a scheduling condition that sets the portable controller to reactivate the drying equipment. For example, after a nighttime period while the drying equipment is deactivated, the schedule associated with the job data specifies that, since the current time is now at a scheduled morning time for the drying process, the portable controller reactivates the drying equipment. In another example aspect, a nominal reactivate condition includes the portable controller receiving a reactivation message that originates from the server system or a given client device. Other nominal reactive conditions can be used.

After detecting a nominal reactivate condition, the process repeats at blocks 610, 611 and so forth.

At block 620, the portable controller detects the nominal end-job condition. For example, this includes that the setpoint condition for sensed environment (e.g., humidity or temperature, or both) has been reached. In an example aspect, the nominal end-job condition includes the setpoint condition has been reached and maintained for a certain period of time.

At block 621, the portable controller executes a job finalization operation, which includes sending a message to the server system that the job has been finalized. In response, at block 622, the server system executes a job finalization operation. This includes, for example, transmitting a message or report, or a combination thereof, to one or more client devices. The message or the report, or both, for example, include: the initial environmental measurements (e.g., humidity, temperature, etc.), the final environmental measurements when the drying job was finalized, the time it took to complete the drying process, the amount of electrical power consumed, and other job related information (e.g., job ID, location, name of the operator or contractor, associated cost, etc.).

At block 623, the portable controller disconnects its communication channel with the server system.

The operator (e.g., a contractor) then removes the portable controller and the one or more drying devices from the room or local space.

Figure 8:
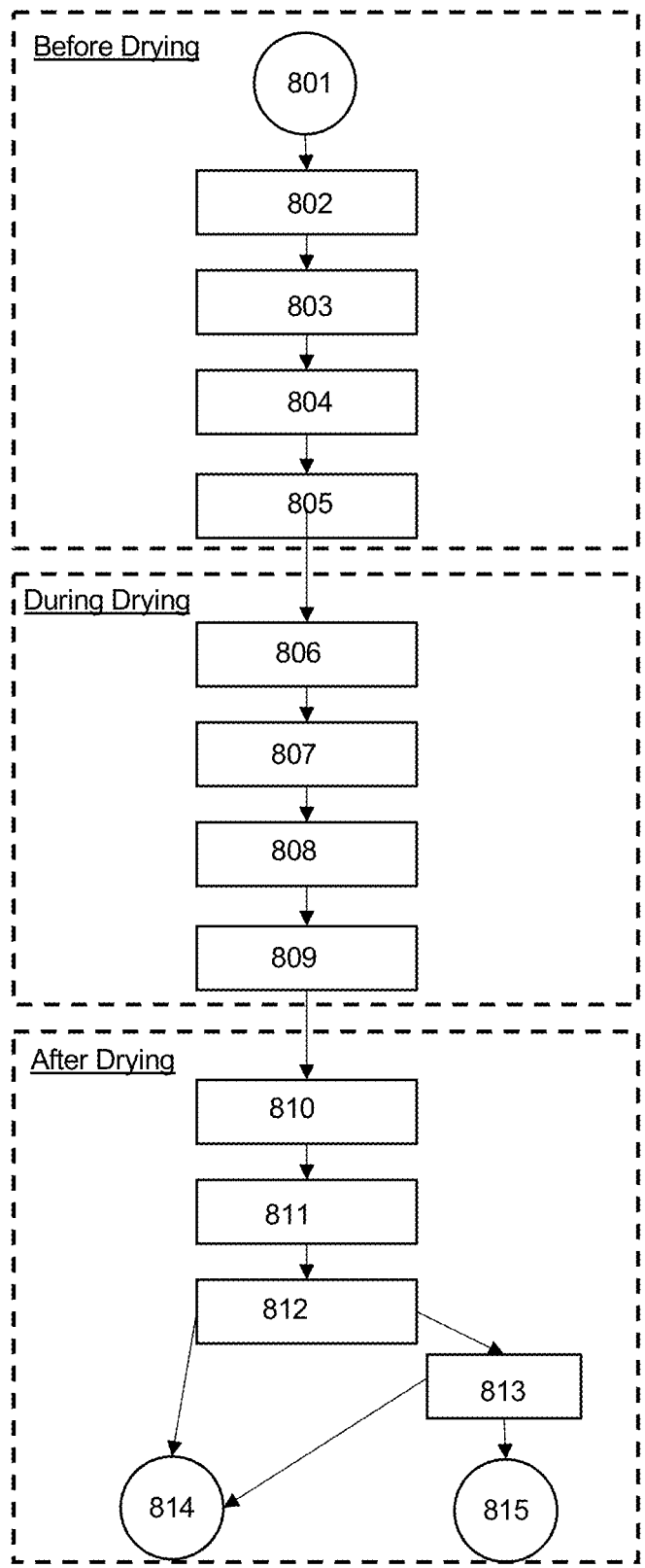
FIG. 8 shows an example of a typical drying process that is used without a portable controller.

Turning to FIG. 8, an example embodiment of a drying process is provided that does not include using the portable controller 102. The example drying process described in FIG. 8 shows a typical current process, which is prone to technical error, human error, technical inefficiencies and human inefficiencies.

Blocks 801 to 805 occur before the drying process is started.

Block 801: A room or a space is in a nominal dry condition.

Block 802: An event occurs that causes the room or space to be wet. For example, a pipe has burst, sewage has backed up, a water tank has failed, or ice has caused leakage.

Block 803: The building owner reaches out to a property manager, an insurance service, or some other company to help with the water damage.

Block 804: A contractor is assigned to help with the water damage.

Block 805: The contractor arrives at the building at performs emergency work. This includes removing the affected saturated building materials (e.g., saturated wall, saturated carpet, saturated furniture, etc. Surfaces are cleaned and sanitized. Other actions can be taken in this emergency work.

Blocks 806 to 809 occur during the process.

Block 806: The contractor brings drying equipment into the building and positions the drying equipment for drying. Each drying equipment device is turned on.

Block 807: The contractor manually monitors the drying. A restoration technician may periodically take moisture readings.

Block 808: The contractor sets the drying time and leaves the building.

Block 809: The contractor returns to the building after some time (e.g., hours, days, weeks) and picks up the drying equipment.

Blocks 810 to 815 occur after the drying process.

Block 810: The contractor sends a report to an adjuster or insurance company. This report, for example, includes manually recorded drying logs, labor time sheets, and photographic evidence. It is herein recognized that manually preparing this report is time-consuming and subject to inaccuracy (e.g., including fraud).

Block 811: The contractor provides a cost associated with the drying process, including the monitoring, the setup, and the use of the drying equipment.

Block 812: A building management company or an insurance company (herein called the reviewing party) will review the report and the cost.

Block 813: The reviewing party will look to see if the cost, or time, or some other parameter is over a certain threshold.

If no issues are detected, then the process proceeds to block 814, which is reimbursement or payment to the contractor.

If an issue is detected, the process proceeds to no reimbursement or payment, or a lower reimbursement or payment, as per block 815.

Figure 9:
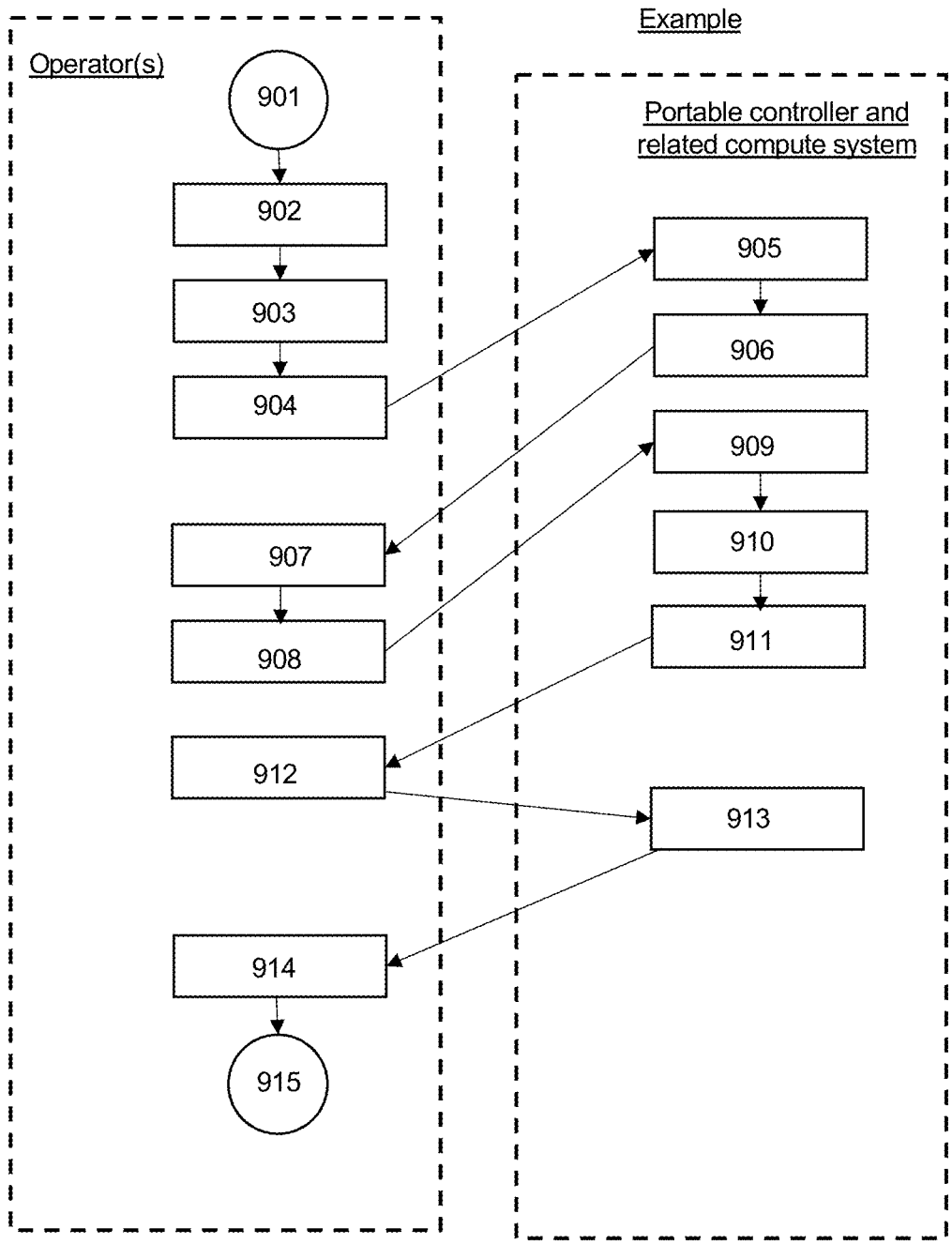
FIG. 9 is an example embodiment of a drying process utilizing a portable controller.

Turning to FIG. 9, an example drying process is shown which includes using the portable controller.

Blocks 901 to 904 are the same as blocks 801 to 804 respectively. However, using the front end stack 503, a client device 113 inputs the information about the water damage, the insurer or building manager, or both, are used to create a job entry into the server system 112. For example, at block 905, a job ID is created. It includes the location of the job, a description of the area that needs drying and monitoring, and the type and number of drying equipment to be used.

At block 906, the contractor brings the portable controller 102 to the location (e.g a room or space) that needs drying. The portable controller 102 is activated. Sensor data, associated with timestamp information, and preferably location information, is gathered to obtain a baseline. The sensor data includes, for example, relative humidity, ambient temperature, internal temperature of the portable controller, current or power, and moisture meter data.

At block 907, the contractor performs the emergency work. These activities include the activities described at block 805.

At block 908, the contractor sets up the drying equipment (e.g., one or more dehumidifiers, blowers, fans, heaters, etc.).

At block 909, the drying equipment is positioned and plugged into one or more portable controllers, via the one or more receptacles 218, 219. It will be appreciated that a drying device that has its own power switch is set to the "on" or "power" position, so that the portable controller can control the drying device. The exact time the drying equipment is plugged into the portable controller can be recorded by a spike in the current reading (e.g., via the current or power sensor 214), which is associated with a timestamp.

At block 910, the portable controller remotely and autonomously monitors and controls the drying process. This includes, for example, sending alerts regarding anomalies or faults, recording and creating drying logs, and allowing for remote control of the drying equipment from the server system or a client device, or both.

At block 911, the portable controller automatically turns off the drying equipment. This is determined by detecting the ambient environment (e.g., relative humidity, temperature, moisture meter, etc.) and confirming that the room or space is sufficiently dry. The portable controller sends a message to the contractor alerting that the drying process has finished, and to pick up the drying equipment.

At block 912, the contractor picks up the drying equipment and the portable controller.

At block 913, the information collected by the portable controller is stored at the server system. The server system uses this information to automatically generate a report and send the same to relevant parties (e.g., contractor, building manager, adjuster, insurance company, etc.). For example, the report includes one or more of the following: the contractor's time of arrival at the location; the address of the location; the name of the contractor; the affected areas; the runtime of equipment per area; the equipment types and quantities, and total number of equipment; the humidity (e.g., relative humidity) and temperature logs per area; the moisture meter content logs per area (e.g., which are sensed using sensor(s) 107, 108); and the power consumption logs per area and totals.

At block 914, the contractor or the server system uses this information to create a cost for the work done.

At block 915, this is reviewed payment is made by the relevant party (e.g., building manager, insurance company, etc.).

Figure 10:
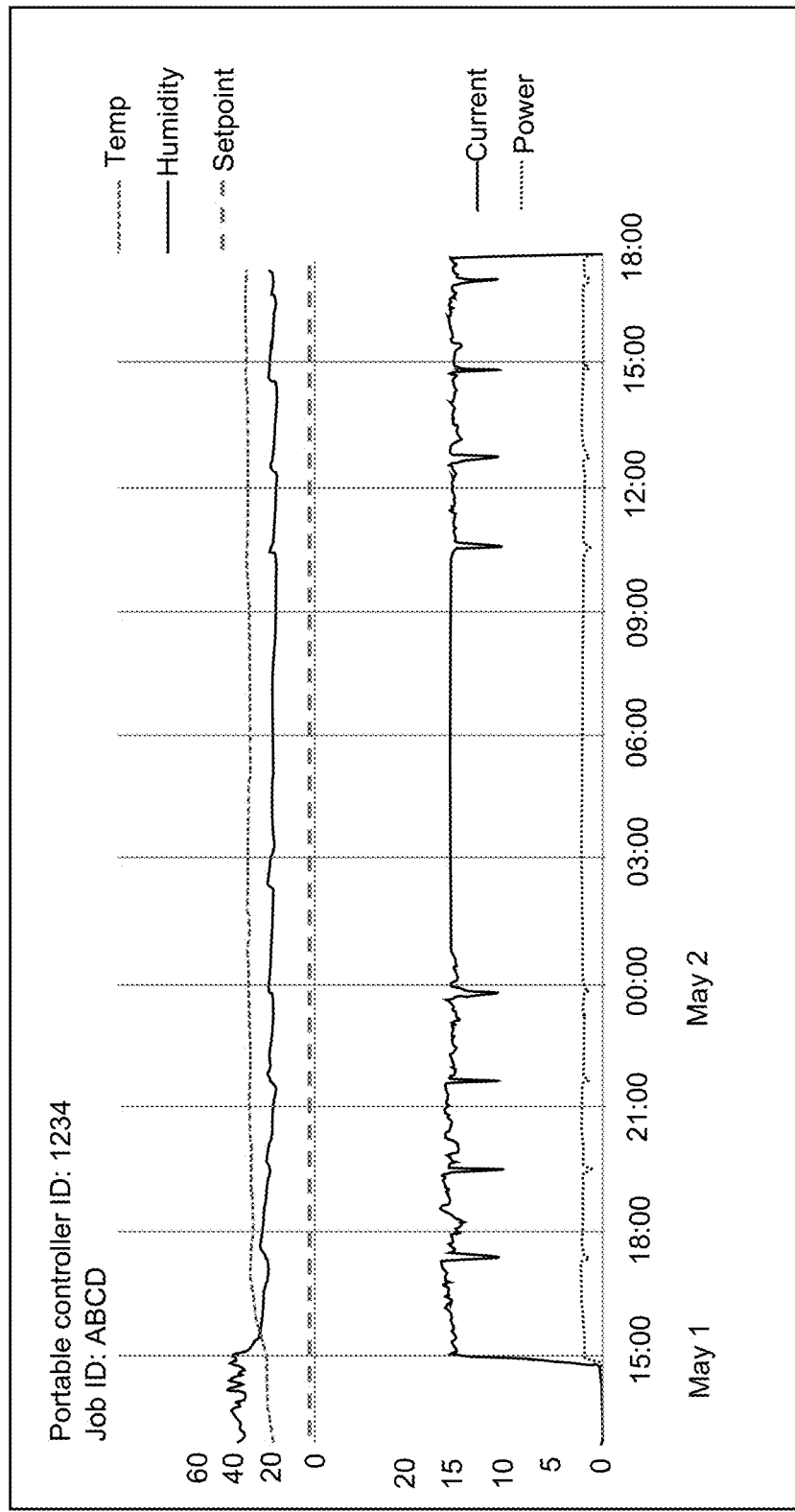
FIG. 10 is an example embodiment of a graphical user interface (GUI) showing the data measured by a portable controller, the GUI displayable on a client device.

Turning to FIG. 10, an example embodiment of a GUI 1001 is shown, which can be displayed by a client device. The GUI shows data measured by a portable controller. For example, the GUI shows the portable controller ID and the job ID. The GUI also includes the detected temperature data, humidity data, and the desired humidity setpoint, as a time graph. The GUI further includes current consumed via the one or more outlet receptacles and power consumed via the one or more outlet receptacles, and this data is displayed over the same time graph. In other words, the change to the detected environmental data (e.g., temperature and humidity) can be seen relative to the power consumption of the drying equipment plugged into the portable controller. It will be appreciated that the GUI 1001 can be displayed via web browser application on a client device, or a native application. In an example embodiment, the GUI is generated by the front end stack or API layer, or both.

In the example shown in FIG. 10, at the time 15:00, the portable controller supplies power to a drying device, and the detected humidity starts to decrease. At 18:00 the next day, the portable controller stops supplying power to the drying device.

Below are example embodiments and example aspects of the portable controller.

In an example embodiment, a portable controller for controlling drying equipment is provided. The portable controller comprises: a housing; a power system within the housing comprising a power supply; one or more switches within the housing, which are connected to the power supply and one or more outlet receptacles, wherein the one or more outlet receptacles are operable to provide electrical power to the drying equipment; a power sensor to measure the electrical power outputted to the one or more outlet receptacles; one or more environmental sensors; and a computer within the housing, wherein the computer is data connected to the power sensor and the one or more environmental sensors, and the computer is electrically connected to the one or more switches to control the one or more switches, which controls the electrical power at the one or more outlet receptacles.

In an example aspect, the one or more outlet receptacles are positioned on the housing and accessible at an exterior surface of the housing.

In another example aspect, the one or more environmental sensors are removably connectable to one or more wire ports positioned on the housing.

In another example aspect, the one or more environmental sensors are positioned on the housing.

In another example aspect, the one or more environmental sensors comprise a humidity sensor.

In another example aspect, the portable controller further comprises an internal temperature sensor that measures the temperature within the housing.

In another example aspect, the housing comprises one or more ports that are connected to the computer, and the one or more ports are configured to connect to one or more removably connectable moisture sensors.

In another example aspect, the power supply is an AC power supply and the one or more outlet receptacles are AC configured outlet receptacles, and the portable controller further comprises an AC-DC converter that is connected between the AC power supply and the computer.

In another example aspect, the one or more switches are one or more solid state relays, which are controlled by the computer.

In another example aspect, the portable controller further comprises a wireless communication module within the housing and data connected to the computer, and wherein the wireless communication module provides information that identifies a current location of the portable controller.

In another example aspect, the computer stores a setpoint humidity value, and continues to supply the electrical power via the one or more outlet receptacles until the setpoint humidity value is achieved.

In another example aspect, after detecting an increase in power consumption at the one or more outlet receptacles above a given threshold, the computer is configured to control the one or more switches to cut power supply to the one or more outlet receptacles.

In another example aspect, after detecting an anomaly in data from at least one of the power sensor and the one or more environmental sensors, the computer is configured to control the one or more switches to cut power supply to the one or more outlet receptacles.

In another example aspect, the portable controller further comprises a wireless communication module within the housing and data connected to the computer, and wherein time stamped measurement data recorded by the power sensor and the one or more environmental sensors are transmitted via the wireless communication module.

In another example aspect, the portable controller further comprises a vent positioned on a first surface of the housing that faces a first direction, wherein the vent is configured to vent out air from an internal space defined within the housing, and the one or more environmental sensors comprises a humidity sensor positioned on a second surface of the housing that faces a second direction which is different from the first direction.

In another example aspect, the one or more outlet receptacles are positioned on an upper portion of the housing, and the one or more environmental sensors comprises a humidity sensor that is positioned on a lower portion of the housing.

In another example aspect, the portable controller further comprises one or more data ports on the housing, and the one or more environmental sensors comprise a moisture meter that comprises a connector that is removably connectable to the one or more data ports.

In another example embodiment, a portable controller for controlling drying equipment is provided, and the portable controller comprises: a housing; a power system within the housing comprising a power supply; one or more switches within the housing, which are connected to the power supply and one or more outlet receptacles, wherein the one or more outlet receptacles are operable to provide electrical power to the drying equipment; a humidity sensor; a computer within the housing, wherein the computer is data connected to the humidity sensor, and the computer is electrically connected to the one or more switches to control the one or more switches, which controls the electrical power at the one or more outlet receptacles; and wherein the one or more outlet receptacles are positioned on an upper portion of the housing, and the humidity sensor is positioned on a lower portion of the housing.

In another example embodiment, a portable controller for controlling drying equipment is provided, and the portable controller comprises: a housing; a power system within the housing comprising a power supply; at least two switches within the housing, which are connected to the power supply and at least two outlet receptacles, wherein the at least two outlet receptacles are operable to provide electrical power to the drying equipment; one or more environmental sensors; a computer within the housing, wherein the computer is data connected to the one or more environmental sensors, and the computer is electrically connected to the at least two switches to control the at least two switches, which controls the electrical power at the at least two outlet receptacles; and a vent positioned on a first surface of the housing that faces a first direction, wherein the vent is configured to vent out air from an internal space defined within the housing, and the one or more environmental sensors comprises a humidity sensor positioned on a second surface of the housing that faces a second direction which is different from the first direction.

In an example aspect, the portable controller further comprises an internal temperature sensor that measures the temperature within the housing, and a cooling fan configured to vent out the air through the vent.

In another example embodiment, a portable controller for controlling drying equipment is provided, and the portable controller comprises: a housing; a power system within the housing comprising a power supply; one or more switches within the housing, which are connected to the power supply and at least one or more outlet receptacles, wherein the one or more outlet receptacles are operable to provide electrical power to the drying equipment; a humidity sensor positioned on the housing; a computer within the housing, wherein the computer is data connected to the humidity sensor and the computer is electrically connected to the one or more switches to control the one or more switches, which controls the electrical power at the one or more outlet receptacles; and wherein the computer stores a setpoint humidity value, and is configured to control the one or more switches to supply the electrical power via the one or more outlet receptacles until the setpoint humidity value is achieved, and wherein the computer is configured to detect achievement of the setpoint humidity value by comparing data from the humidity sensor with the setpoint humidity value.

In another example embodiment, a portable controller for controlling drying equipment is provided, and the portable controller comprises: a housing; a power system within the housing comprising a power supply; one or more switches within the housing, which are connected to the power supply and one or more outlet receptacles, wherein the one or more outlet receptacles are operable to provide electrical power to the drying equipment; a power sensor to measure the electrical power outputted to the one or more outlet receptacles; one or more environmental sensors; a computer within the housing, wherein the computer is data connected to the power sensor and the one or more environmental sensors, and the computer is electrically connected to the one or more switches to control the one or more switches, which controls the electrical power at the one or more outlet receptacles; the computer is further configured to record measurement data measured by at least one of the power sensor and the one or more environmental sensors; a wireless communication module within the housing and data connected to the computer, and the wireless communication module configured to transmit the measurement data; and wherein the power sensor comprises an alternating current (AC) sensor and the electrical power is AC power.

In an example aspect, after detecting an increase in power consumption at the one or more outlet receptacles above a given threshold, the computer is configured to control the one or more switches to disconnect the electrical power from the one or more outlet receptacles.

In another example aspect, the measurement data comprises power consumption data measured by the power sensor, environmental data measured by the one or more environmental sensors, and associated timestamp information.

In another example embodiment, a system for controlling and monitoring restoration equipment is provided. The system comprises: a portable controller and a server system in wireless data communication with each other, and portable controller associated with a portable controller ID is configured to receive and store a job ID sent by the server system; the portable controller comprising one or more outlet receptacles to which the restoration equipment is connectable, and the portable controller configured to provide electrical power or to cut off the electrical power to the one or more outlet receptacles based on detecting one or more environment conditions, and the portable controller is further configured to transmit, along with the job ID, the one or more detected environment conditions and power consumption data of the portable controller to the server system; and the server system configured to store in a database the one or more detected environment conditions and the power consumption data over a time series, and in association with the potable controller ID and the job ID.

In an example aspect, the job ID is associated with a location to perform a restoration process.

In another example aspect, the portable controller is configured to transmit a current location of the portable controller to the server system, and the server system verifies that the current location matches the location associated with the job ID.

In another example aspect, the portable controller receives a setpoint humidity level from the server system, and the portable controller is configured to provide the electrical power to the one or more outlet receptacles until the setpoint humidity level has been achieved.

In another example aspect, after the portable controller detects that the electrical power provided to the one or more outlet receptacles exceeds a power threshold, then the portable controller cuts off the electrical power to the one or more receptacles.

In another example aspect, the server system transmits a deactivation command to the portable controller, and, in response to receiving the deactivation command, the portable controller cuts off the electrical power to the one or more outlet receptacles.

In another example aspect, the server system transmits a reactivation command to the portable controller, and, in response to receiving the reactivation command, the portable controller provides the electrical power to the one or more outlet receptacles.

In another example aspect, the portable controller comprises an internal temperature sensor and, after the portable controller detects that internal temperature has passed an internal temperature threshold, the portable controller cuts off the electrical power to the one more outlet receptacles.

In another example aspect, the portable controller comprises one or more ports, and the system further comprises a moisture meter comprising a connector that is removably connectable to the one or more ports.

It will be appreciated that any module or component exemplified herein that executes instructions may include or otherwise have access to non-transitory computer readable media such as storage media, computer storage media, or data storage devices (removable and/or non-removable) such as, for example, memory chips, magnetic disks, optical disks. Computer storage media may include volatile and non-volatile, removable and non-removable media implemented in any method or technology for storage of information, such as computer readable instructions, code, processor executable instructions, data structures, program modules, or other data. Examples of computer storage media include random access memory (RAM), dynamic random access memory (DRAM), static random access memory (SRAM), read-only memory (ROM), solid-state ROM, electrically erasable programmable read-only memory (EEPROM), flash memory or other memory technology, or any other medium which can be used to store the desired information and which can be accessed by an application, module, or both. Any such computer storage media may be part of the servers or portable controllers, or the portable controller's computer, or accessible or connectable thereto. Any application or module herein described may be implemented using computer readable/executable instructions that may be stored or otherwise held by such computer readable media.

It will be appreciated that different features of the example embodiments of the system and methods, as described herein, may be combined with each other in different ways. In other words, different devices, modules, operations, functionality, and components may be used together according to other example embodiments, although not specifically stated.

The steps or operations in the flow diagrams described herein are just for example. There may be many variations to these steps or operations according to the principles described herein. For instance, the steps may be performed in a differing order, or steps may be added, deleted, or modified.

It will also be appreciated that the examples and corresponding system diagrams used herein are for illustrative purposes only. Different configurations and terminology can be used without departing from the principles expressed herein. For instance, components and modules can be added, deleted, modified, or arranged with differing connections without departing from these principles.

While certain example implementations of the disclosed technology have been described in connection with what is presently considered to be the most practical and various implementations, it is to be understood that the disclosed technology is not to be limited to the disclosed example implementations, but on the contrary, is intended to cover various modifications and equivalent arrangements included within the scope of the claims appended hereto.

The invention claimed is:

1. A system for monitoring drying of a space and controlling drying equipment in the space, the system comprising:
a portable controller and a server;
the portable controller for controlling the drying equipment, the portable controller comprising:
a housing;
a power system within the housing comprising a power supply;
one or more switches within the housing, which are connected to the power supply and one or more outlet receptacles, wherein the one or more outlet receptacles are operable to provide electrical power to the drying equipment;
a power sensor to measure the electrical power outputted to the one or more outlet receptacles;
environmental sensors that comprise a humidity sensor and a temperature sensor;
a computer within the housing, wherein the computer is data connected to the power sensor and the environmental sensors, and the computer is electrically connected to the one or more switches to control the one or more switches, which controls the electrical power at the one or more outlet receptacles;
a wireless communication module configured to wirelessly communicate with the server, including at least communicating relative humidity data and power consumption data of the drying equipment to the server;
the server comprising a processor module, a communication module, and a memory module, and the server configured to obtain the relative humidity data and the power consumption data of the drying equipment from the portable controller and compute a comparison of the power consumption data of the drying equipment over time and the relative humidity data over the time.

2. The system of claim 1, wherein the one or more outlet receptacles of the portable controller are positioned on the housing and accessible at an exterior surface of the housing.

3. The system of claim 1, wherein at least one of the environmental sensors of the portable controller are removably connectable to one or more wire ports positioned on the housing.

4. The system of claim 1, wherein at least one of the environmental sensors of the portable controller are positioned on the housing.

5. The system of claim 1, wherein the portable controller further comprises an internal temperature sensor that measures the temperature within the housing.

6. The system of claim 1, wherein the housing of the portable controller comprises one or more ports that are connected to the computer, and the one or more ports are configured to connect to one or more removably connectable moisture sensors.

7. The system of claim 1, wherein the power supply of the portable controller is an AC power supply and the one or more outlet receptacles are AC configured outlet receptacles, and the portable controller further comprises an AC-DC converter that is connected between the AC power supply and the computer.

8. The system of claim 1, wherein the one or more switches of the portable controller are one or more solid state relays, which are controlled by the computer.

9. The system of claim 1, wherein the wireless communication module is configured to further communicate to the server information that identifies a current location of the portable controller.

10. The system of claim 1, wherein the computer of the portable controller stores a setpoint humidity value, and continues to supply the electrical power via the one or more outlet receptacles for consumption by the drying equipment until the setpoint humidity value is achieved.

11. The system of claim 1 wherein, after detecting an increase in power consumption at the one or more outlet receptacles above a given threshold, the computer of the portable controller is configured to control the one or more switches to cut power supply to the one or more outlet receptacles.

12. The system of claim 1 wherein, after detecting an anomaly in data from at least one of the power sensor and the one or more environmental sensors, the computer of the portable controller is configured to control the one or more switches to cut power supply to the one or more outlet receptacles.

13. The system of claim 1, wherein the portable controller further comprises a vent positioned on a first surface of the housing that faces a first direction, wherein the vent is configured to vent out air from an internal space defined within the housing, and the humidity sensor is positioned on a second surface of the housing that faces a second direction which is different from the first direction.

14. The system of claim 1, wherein the one or more outlet receptacles are positioned on an upper portion of the housing, and the humidity sensor that is positioned on a lower portion of the housing.

15. The system of claim 1, wherein the portable controller further comprises one or more data ports on the housing, and the one or more environmental sensors comprise a moisture meter that comprises a connector that is removably connectable to the one or more data ports.

16. The system of claim 1, wherein the server is configured to further compute a prediction of a total amount time to complete a drying process of the space.

17. The system of claim 1, wherein the server is configured to further compute a prediction of a total power consumption of the drying equipment to complete a drying process of the space.

18. The system of claim 1, wherein the server is configured to further output an initial environmental measurement of the space including a relative humidity measurement, a final environment measurement of the space after a drying process of the space is completed, a time amount to complete the drying process, and an amount of power consumed by the drying equipment to complying the drying process.

19. The system of claim 1, wherein a table for correlating power consumption with one or more types of drying equipment is stored in the memory module of the server, and the server is configured to access the table by inputting a measured power consumption to identify a potential drying device used for drying the space.

20. The system of claim 1, wherein, after detecting that a relative humidity setpoint has been reached, the portable controller is configured to automatically cut power supply to the one or more outlet receptacles to deactivate the drying equipment, and to transmit a message to the server indicating that the drying process is complete.

21. The system of claim 1, wherein the comparison of the power consumption data over time and the relative humidity data over the time is displayable in a graphical user interface.

* * * * *